United States Patent [19]

Roos

[11] 4,449,727

[45] May 22, 1984

[54] SKID CONTROL CAR

[76] Inventor: Bertil Roos, Box 221, Blakeslee, Pa. 18610

[21] Appl. No.: 412,756

[22] Filed: Aug. 30, 1982

[51] Int. Cl.³ .............................................. B62D 9/00
[52] U.S. Cl. .................................... 280/91; 280/81 A
[58] Field of Search ..................... 280/771, 91, 99, 88, 280/103, 81 A, 660, 93; 180/234, 236, 240

[56] References Cited

U.S. PATENT DOCUMENTS

| 2,819,769 | 1/1958 | Moorehead | 280/91 |
|---|---|---|---|
| 2,971,270 | 2/1961 | Hasty | 35/11 |
| 3,227,238 | 1/1966 | Strader | 280/91 |
| 3,611,589 | 10/1971 | Wiltse | 35/11 |
| 3,880,439 | 4/1975 | Wolter | 280/81 A |
| 3,885,324 | 5/1975 | Davenport et al. | 35/11 |
| 3,939,580 | 2/1976 | Nakano et al. | 35/11 |
| 3,991,485 | 11/1976 | Golenski | 35/11 |
| 4,121,356 | 10/1978 | Gambon | 35/11 |
| 4,303,224 | 12/1981 | Nelson | 254/131 |

FOREIGN PATENT DOCUMENTS

| 930380 | 1/1948 | France | 280/99 |
|---|---|---|---|
| 446957 | 3/1949 | Italy | 280/81 A |
| 794241 | 4/1958 | United Kingdom | 280/81 A |

Primary Examiner—Joseph F. Peters, Jr.
Assistant Examiner—Ross Weaver
Attorney, Agent, or Firm—Seidel, Gonda & Goldhammer

[57] ABSTRACT

An automotive vehicle having a front wheel drive is provided with pivotable rear wheels having positive casters up to about ten degrees to facilitate training race car drivers in skid control.

12 Claims, 6 Drawing Figures

SKID CONTROL CAR

BACKGROUND OF THE INVENTION

There is a need for an automotive vehicle to facilitate training conventional automobile drivers and race car drivers how to control skids when going around curves on a road or track. Such vehicles are needed to teach drivers how to avoid skids, what causes skids, and how to control skids safely.

SUMMARY OF THE INVENTION

The present invention is directed to an automotive vehicle for training drivers in skid control. The vehicle has a set of front wheels and a set of pivotable rear wheels. The motor drive is preferably connected to the front wheels. A steering wheel is coupled to the front wheels for steering the vehicle. The rear wheels pivot on an axis having a positive caster preferably about 5-10 degrees. The rear wheels are normally held in a forward rolling position by connecting rods and bias means.

It is an object of the present invention to provide an automotive vehicle for training drivers in skid control.

It is another object of the present invention to provide an automotive skid training vehicle having front wheel drive and positive rear wheels with a substantial positive caster.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
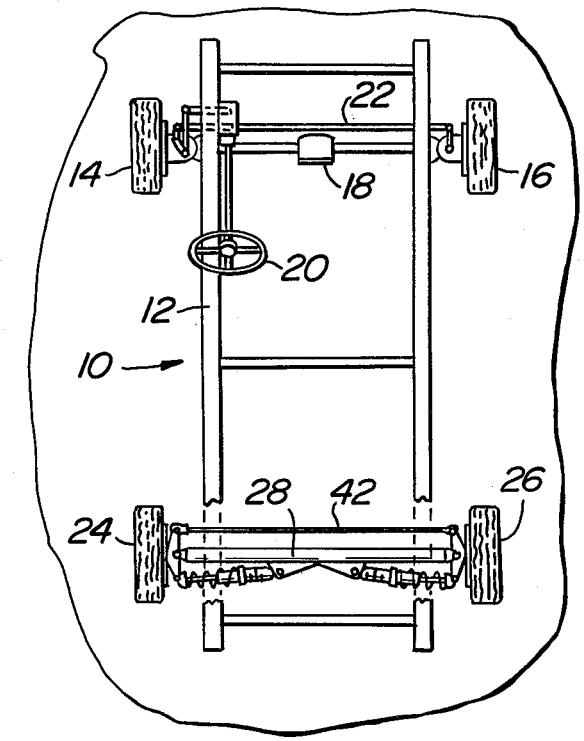
FIG. 1 is a top plan skeletal view of a automotive vehicle in accordance with the present invention.
Figure 2:
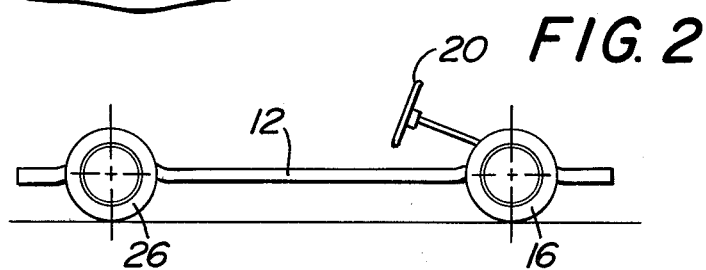
FIG. 2 is a side elevation view of the vehicle shown in FIG. 1.
Figure 3:
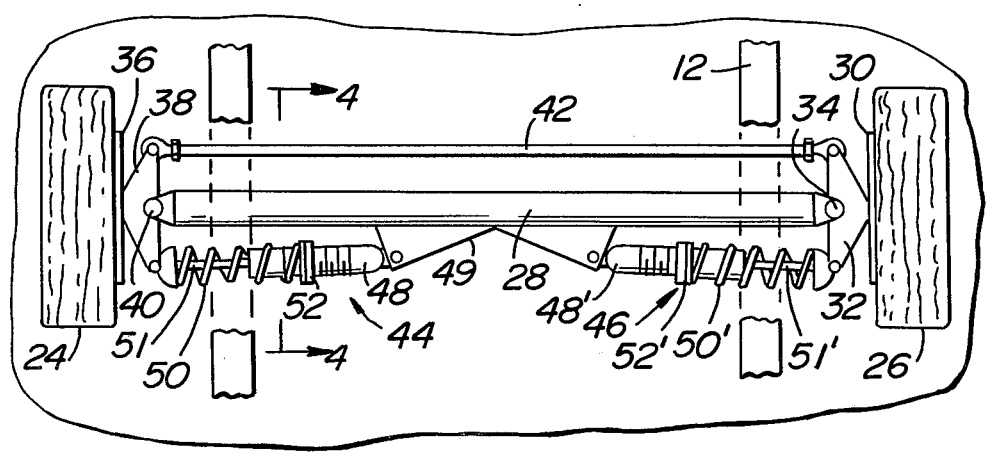
FIG. 3 is an enlarged detailed view of the rear axle.

Referring to the drawing in detail, wherein like numerals indicate like elements, there is shown in FIG. 1 a skeletal view of an automotive training vehicle in accordance with the present invention designated generally as 10. For purposes of the present disclosure the vehicle 10 is shown in skeletal form and includes a frame 12. Frame 12 supports a set of front wheels 14, 16. A motor drive 18 is preferably provided for driving the front wheels 14, 16. A steering wheel 20 is connected by way of linkage 22 to the front wheels 14, 16 for steering the vehicle 10. The caster on the front wheels is adjusted to keep the front wheels pointed straight ahead so that it will be easy to return them to a straight position after making a turn.

The frame 12 supports an axle 28 connected at its ends to the rear wheels 24, 26. A bearing support 30 for rear wheel 26 is fixedly connected to a link 32. Link 32 is pivoted to one end of axle 28 at pivot 34. The axis of pivot 34 is approximately 5 to 10 degrees displaced with respect to the vertical so as to create a positive caster of 5 to 10 degrees for wheel 26. An imaginary extension of that axis first contacts the ground in front of the wheel 26.

Spring means for connecting the front and rear wheels to the frame 12 are not shown as they are conventional.

A similar link 38 is connected to the bearing support 36 of wheel 24. Link 38 is pivotably connected to the other end of axle 28 at pivot 40. Pivot 40 is similarly inclined as described above with respect to pivot 34.

One end of the links 32, 38 are each pivoted to one end of a rod 42. The other end of link 38 is pivotably connected to one end of a wheel bias mechanism 44. The other end of link 32 is pivotably connected to one end of a wheel bias mechanism 46. The wheel bias mechanisms 44, 46 are identical. Wheel bias mechanisms 44 and 46 include gas pressure shock absorbers 48 and 48' having one end pivotably connected to a bracket 49 on the axle 28. The piston rods 51, 51' associated with shock absorbers 48, 48' are pivotably connected to the adjacent ends of links 38, 32. Springs 50, 50' extend from the rod ends to adjustable rings 52, 52' threaded to the outer periphery of shock absorbers 48. Springs 50, 51' and rod 42 bias wheels 24, 26 to a straight position. Rings 52, 52' adjust the spring force for maintaining the wheels in the straight position.

Figure 4:
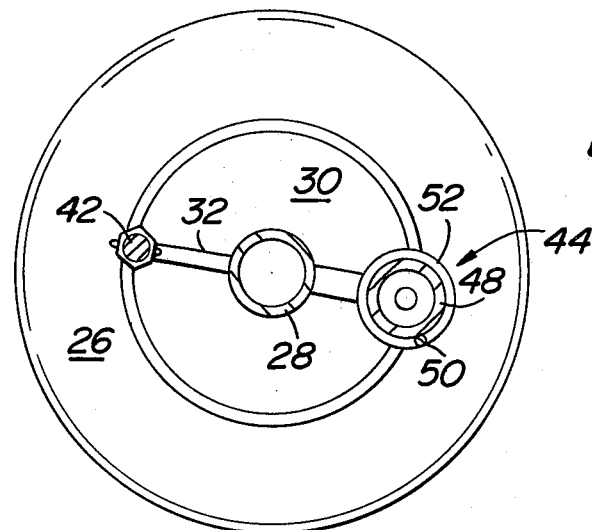
FIG. 4 is a sectional view taken along the line 4—4 in FIG. 4.

When going around a curve, the steering wheel 20 will be manipulated by the student driver to maintain the desired angular relationships for the front wheels 14, 16. A force in a sideways direction is created on the rear wheels 24, 26. Because of the caster angle, this force is disposed from the vertical to make the rear wheels turn toward the outside of the turn against the spring force and a slide or skid is simulated. See FIG. 4. The greater the caster angle, the smaller the sideways force needed to start a slide or skid for a given spring force. Student drivers will learn what causes skids and how to control them safely.

Figure 5:
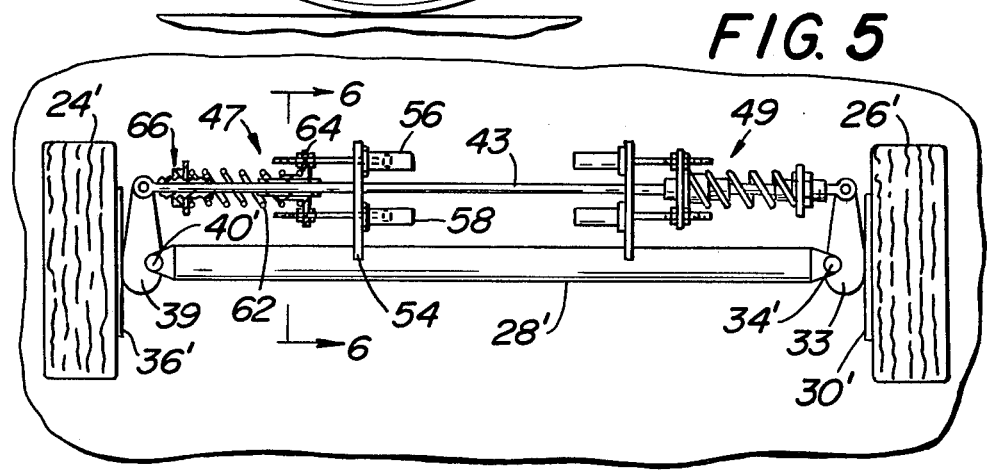
FIG. 5 is a view similar to FIG. 4 but showing another embodiment of the present invention.
Figure 6:
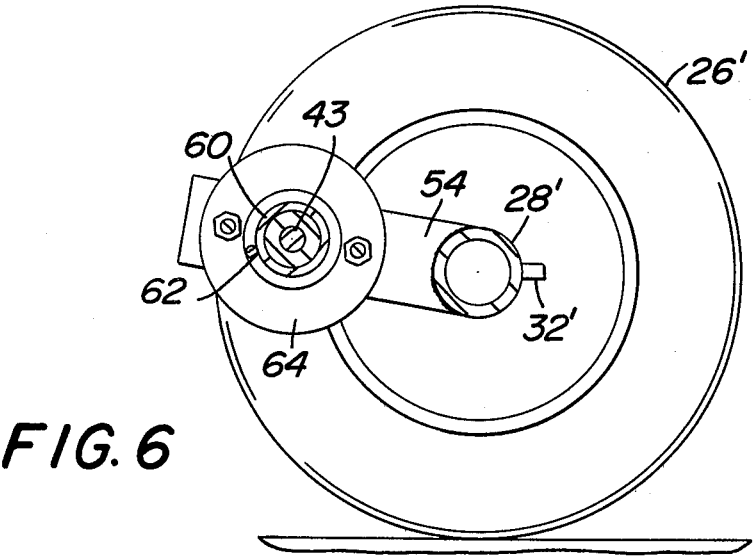
FIG. 6 is a view taken along the line 6—6 in FIG. 5.

In FIGS. 5 and 6 there is illustrated another embodiment of the present invention wherein corresponding elements are provided with corresponding primed numerals. In FIG. 5, the wheel bias mechanisms 47 and 49 are identical. Hence, only wheel bias mechanism 47 will be described in detail.

The wheel bias mechanism 47' is coupled to the link 39 by way of the rod 43. A bracket 54 is attached to the axle 28'. The bracket 54 supports a pair of hydraulic cylinders 56, 58. The plungers associated with the cylinders cylinders are connected to a disk 64. Disk 64 is connected to a sleeve 60 surrounding the rod 43. A spring 62 extends between the disks 64 and an adjustable nut and washer assembly 66. The embodiment in FIGS. 5 and 6 is otherwise similar to the first embodiment described above and operates in substantially the same manner. The spring force is controlled by assembly 66 with the cylinders 56, 58 damping out oscillations and adjusting spring pressure. A hydraulic conduit not shown is connected to each cylinder 56, 58 and a master cylinder.

A specific caster applied to the rear wheels is adjustable in any conventional manner. If desired it can be made adjustable from the inside of the vehicle by the instructor so that a beginner student can start learning skid control at a comfortable speed. Adjustment of the spring tension controls the ease with which the vehicle can be put into a controlled skid. This invention eliminates the need for a skid pad.

While vehicle 10 is preferably provided with a front wheel drive, it may have a rear wheel drive. It will be obvious to those skilled in the art that appropriate adjustments may be made so that vehicle 10 can be driven in a normal manner.

The present invention may be embodied in other specific forms without departing from the spirit or essential attributes thereof and, accordingly, reference should be made to the appended claims, rather than to the foregoing specification, as indicating the scope of the invention.

I claim:

1. An automotive vehicle for training drivers in skid control wherein said vehicle has a set of front wheels, said front wheels being steerable, said rear wheels being pivotable and having a positive caster, said caster causing said rear wheels to steer away from the direction of a turn executed by the driver of the vehicle, said rear wheels being connected together by a transverse rod for causing the wheels to turn by the same amount, and wheel bias means to bias said rear wheels to a normally straight position.

2. A vehicle in accordance with claim 1 wherein said caster is 5–10 degrees.

3. A vehicle in accordance with claim 2 wherein said vehicle includes a rear axle, said rear wheels being connected to the rear axle by discrete links which are pivoted on the axle, said pivot axis being inclined at an angle of about 5 to 10 degrees with respect to the vertical.

4. A vehicle in accordance with claim 3 including a discrete wheel bias mechanism associated with each of the rear wheels, each wheel bias mechanism being supported by the rear axle and being pivotably connected to one end of its associated link.

5. A vehicle in accordance with claim 4 wherein each wheel bias mechanism is on an opposite side of the axle from said rod.

6. A vehicle in accordance with claim 4 wherein each wheel bias mechanism is connected to one end of its associated link by said rod.

7. A vehicle in accordance with claim 4 wherein each wheel bias mechanism includes a spring biasing its associated rear wheel to a straight position.

8. In an automotive front wheel drive vehicle for training drivers in skid control comprising a frame supporting a rear axle, a set of pivotable rear wheels rotatably supported by said axle, a transverse rod having its ends coupled to said rear wheels for causing the wheels to turn by the same amount, and said rear wheels having a positive caster causing them to steer away from the direction of the turn executed by the driver of the vehicle.

9. In a vehicle in accordance with claim 8 wherein said rear wheels are connected to the rear axle by discrete links which are pivoted on the axle, the pivot axis being inclined at an angle of about 5 to 10 degrees with respect to the vertical.

10. In a vehicle in accordance with claim 8 including a discrete wheel bias mechanism associated with each of the rear wheels, each wheel bias mechanism being supported by the rear axle and including a spring biasing its associated rear wheel to a straight position.

11. A vehicle in accordance with claim 4 wherein the end of each wheel bias mechanism remote from its associated link is pivotably supported by the rear axle.

12. A vehicle in accordance with claim 4 wherein each wheel bias mechanism includes a shock absorber.

* * * * *